(12) United States Patent
Enyedy (10) Patent No.: US 9,114,483 B2
(45) Date of Patent: Aug. 25, 2015

(54) DRIVE ROLL ASSEMBLY (71) Applicant: Lincoln Global, Inc., City of Industry, CA (US)

(72) Inventor: Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 14/063,310

(22) Filed: Oct. 25, 2013

(65) Prior Publication Data

US 2014/0048525 A1 Feb. 20, 2014

Related U.S. Application Data (63) Continuation-in-part of application No. 12/610,724, filed on Nov. 2, 2009, now Pat. No. 8,569,653.

(51) Int. Cl.
*B23K 9/12* (2006.01)
*B23K 37/02* (2006.01)
*B23K 9/133* (2006.01)

(52) U.S. Cl.
CPC ........... *B23K 37/0247* (2013.01); *B23K 9/1336* (2013.01)

(58) Field of Classification Search
USPC ............................ 219/136, 137; 633/136, 137
See application file for complete search history.

(56) References Cited

U.S. PATENT DOCUMENTS

| 4,404,457 | A | * | 9/1983 | Rokujio et al. | ............ 219/137.2 |
| 5,816,466 | A | | 10/1998 | Seufer | |
| 5,836,539 | A | | 11/1998 | Grimm et al. | |
| 6,286,748 | B1 | | 9/2001 | Cooper | |
| 6,427,894 | B1 | | 8/2002 | Blank et al. | |
| 6,505,974 | B2 | | 1/2003 | Giesler et al. | |
| 6,557,742 | B1 | | 5/2003 | Bobeczko et al. | |
| 6,568,578 | B1 | | 5/2003 | Kensrue | |
| 6,855,914 | B1 | * | 2/2005 | Kaufman et al. | ........ 219/137.71 |
| 7,374,074 | B2 | | 5/2008 | Matiash | |
| 7,441,682 | B2 | | 10/2008 | Kerekes et al. | |
| 8,269,143 | B2 | | 9/2012 | Christopher et al. | |
| 2004/0011776 | A1 | * | 1/2004 | Mukai et al. | ............. 219/137.71 |
| 2006/0081675 | A1 | * | 4/2006 | Enyedy | ......................... 226/181 |

(Continued)

FOREIGN PATENT DOCUMENTS

EP 1016486 A1 7/2000
JP S63026271 A 2/1988

OTHER PUBLICATIONS

Kempii, Components, Date Unknown.
Miller, Components Miller S24A, Date Unknown.
Fronius, Components, Date Unknown.
Lincoln, Components, Date Unknown.

(Continued)

*Primary Examiner* — David Vu
*Assistant Examiner* — Jonthan Han
(74) *Attorney, Agent, or Firm* — Hahn Loeser & Parks LLP (57) ABSTRACT

A wire feeder includes a wire feeder housing that may enclose one or more drive rollers rotatably connected with respect to the wire feeder housing for engaging welding wire. The one or more drive rollers may be adjustable and adapted to drive the welding wire to a welding gun connected to the wire feeder. A drive motor is incorporated for delivering power for rotating the one or more drive rollers. Friction reducing devices, such as bearings, may be utilized and positioned between one or more driver rollers and the housing, where the bearings are electrically non-conducting for preventing the discharge of electrical energy across the bearing surfaces.

27 Claims, 7 Drawing Sheets

(56) References Cited

U.S. PATENT DOCUMENTS

2007/0119840 A1* 5/2007 Flattinger et al. ........ 219/137.31
2011/0100969 A1 5/2011 Enyedy
2011/0204034 A1 8/2011 Schartner et al.
2012/0285939 A1 11/2012 Kessler et al.

OTHER PUBLICATIONS

International Search Report with Written Opinion for application PCT/IB2010/002770 dated Mar. 15, 2011.
International Search Report with Written Opinion for PCT/IB2014/002069 dated Mar. 2, 2015.

* cited by examiner

DRIVE ROLL ASSEMBLY

CROSS-REFERENCE TO RELATED APPLICATIONS

This application is a continuation-in-part of and claims priority to U.S. patent application Ser. No. 12/610,724 filed 2 Nov. 2009, the contents of which are fully incorporated by reference.

TECHNICAL FIELD

The present invention pertains to welding wire feeders, and more particularly, to welding wire feeders having electrically isolated components.

BACKGROUND OF THE INVENTION

Wire feeders, like those used in arc welding applications, convey wire from a continuous feed source to a weld torch. In many instances, the wire is fed from a reel or drum at a rate determined by the operating parameters of the power source. Accordingly, the wire feeder includes a drive motor that delivers the wire at various feed rates. Typically pinch rollers are used to grip the wire pushing, or in certain cases pulling, it toward the work piece. To facilitate smooth operation, bearings may be included that allow the pinch rollers to rotate with reduced friction.

However, it is known that using aluminum as a welding wire is increasing due to its lightweight attributes and corrosion-resistant properties. However, aluminum can present some real challenges. Equipment must be adapted specifically to handle the softer aluminum wire and machine settings that work well with steel wire may not be appropriate. In fact, aluminum wire can easily be damaged by equipment set up for steel wire.

One of the recommended changes is the use of a nylon or Teflon® liner to reduce friction and wire shaving. It is also recommended to substitute a U-shaped groove in the drive rolls, rather than a more traditional V-shaped groove so that there are no sharp edges to shave off the aluminum wire. Also, the tension on the drive roll should be reduced from typical steel settings to prevent crushing the aluminum wire during feeding. Since aluminum expands more than steel as it heats up, the proper-sized hole in the contact thip is larger for aluminum than for steel. Brake tension on the wire spindle should be set more loosely than it would normally be set for steel so that less force is required to pull the wire off the spool.

Because the column strength of aluminum is much less than steel, feeding aluminum wire often requires special feed mechanisms. One way to assist in the feeding of aluminum wire is to use a "push-pull" system which utilizes dual motors: an assist motor that pushes the electrode from the feeder and a primary motor that is located in the gun that pulls the electrode. This type of system offers superior feeding performance of a spool gun with many of the advantages of a compact push system. A push-pull system provides the most uniform feeding and can hold larger spools of wire. The gun can be taken long distances from the power source and does not require the costly 1 lb. spools of the spool gun method and has a comfortable ergonomic gun that fits into tighter places.

BRIEF SUMMARY

The embodiments of the present invention pertain to a push-pull wire feeder having a wire feeder housing that encloses one or more drive rollers rotatably connected with respect to the wire feeder housing for engaging welding wire and one or more drive rollers positioned within the welding gun. The one or more drive rollers are adjustable and adapted to drive the welding wire to a welding gun connected to the wire feeder. A drive motor is included for delivering power and more specifically torque for rotating the one or more drive rollers. Friction reducing devices, such as bearings, are utilized and positioned between one or more driver rollers and the housing, where the bearings are electrically non-conducting for preventing the discharge of electrical energy across the bearing surfaces.

In one aspect of the invention, a wire feeder for conveying associated welding wire is described which includes at least the following: a wire feeder having one or more drive rollers, the one or more drive rollers being adapted to push the associated welding wire toward the welding gun; a welding gun operatively connected to the wire feeder for conveying associated welding wire used in arc welding, the welding gun having at least one drive roller within the welding gun to pull the welding wire toward an egress aperture in the welding gun; at least a first driver motor operatively connected to deliver power for rotating the one or more drive rollers in the wire feeder; at least a second driver motor operatively connected to deliver power for rotating the at least one drive roller in the welding gun; and, one or more bearings positioned between the one or more drive rollers in the wire feeder and the at least one drive roller within the welding gun, said one or more bearings coaxial with each of said one or more drive rollers, wherein each of the one or more bearings is electrically non-conducting for preventing the discharge of electrical energy across the one or more bearings.

The one or more bearings are constructed from a dielectric material, often ceramic, and an electrically non-conducting material. The drive rollers further include: a plurality of adjacent spherical bearing balls, and, wherein the bearing balls are constructed from ceramic. Often the drive motors are variable speed drive motors for conveying the associated welding wire at varying speeds.

In another aspect of the invention, a push-pull drive system for a welding wire feeder conveying associated electrically charged wire, is described which includes at least: a first wire feeding means positioned external to a welding wire gun, the first wire feeding means comprising: a generally rigid apertured first feed plate having one or more recesses; at least one first pair of drive rollers rotatably connected with respect to the first feed plate, wherein the drive rollers are spaced apart to propel the associated electrically charged wire, the first pair of drive rollers having a first pair of opposed rollers which matingly engage with each of the drive rollers; a first means for reducing rolling friction operatively positioned between each of the first rollers and the first feed plate, the first means for reducing rolling friction being coaxially positioned with the first rollers, and wherein the first means for reducing rolling friction is electrically non-conducting for substantially preventing the discharge of electrical energy between the first feed plate and the first rollers; and a second wire feeding means positioned within the welding wire gun, the second wire feeding means comprising: a second apertured welding wire feed plate positioned within the welding gun, one side of the second feed plate connected to a gun gooseneck; at least one second pair of drive rollers rotatably connected with respect to the second feed plate, wherein the second pair of drive rollers are spaced apart to propel the associated electrically charged wire, the second drive rollers having a pair of second opposed rollers which matingly engage with each of the second drive rollers; and a second means for reducing rolling friction operatively positioned between each of the second rollers and the second feed plate, the second means for reducing rolling friction being coaxially positioned with the second rollers, and wherein the second means for reducing rolling friction is electrically non-conducting for substantially preventing the discharge of electrical energy between the second feed plate and the second roller.

Each of the means for reducing rolling friction comprises one or more rolling elements constructed from ceramic, although it is possible that each of the one or more rolling elements are constructed from metal and wherein the one or more rolling elements are coated with ceramic thereby completely covering the one or more metal rolling elements. Optionally, each of said means for reducing rolling friction comprises one or more rolling elements constructed from non-conducting polymeric material.

In a preferred aspect of the invention, each of the at least one pair of drive rollers includes first and second drive rollers, and, wherein the position of the first drive roller is adjustable with respect to the second drive roller for driving differently sized associated wire. The system may further include wire support guides having a wire passage for channeling the associated electrically charged wire.

In another aspect of the invention, the first and second feed plates are constructed from electrically non-conducting material. Typically, each of said means for reducing rolling friction comprises: a bushing constructed from a dielectric material, e.g., ceramic, and often one implementation is where the ceramic is glass.

Each of said means for reducing rolling friction comprises: at least one bearing race and a plurality of rolling elements, wherein the at least one bearing race is received into the one or more recesses of each of said feed plates; and wherein the at least one bearing race or the plurality of rolling elements is coated or constructed from a non-conductive dielectric material.

In yet another aspect of the invention, a spool gun drive system for a welding wire feeder conveying associated electrically charged wire, is described which includes at least: a wire feeding means positioned within the welding wire gun, the wire feeding means comprising: an apertured welding wire feed plate positioned within the welding gun, one side of the feed plate connected to a gun gooseneck; at least one pair of drive rollers rotatably connected with respect to the feed plate, wherein the pair of drive rollers are spaced apart to propel the associated electrically charged wire, the drive rollers having a pair of opposed rollers which matingly engage with each of the drive rollers; and a means for reducing rolling friction operatively positioned between each of said rollers and the feed plate, the means for reducing rolling friction being coaxially positioned with the rollers, and wherein the means for reducing rolling friction is electrically non-conducting for substantially preventing the discharge of electrical energy between the feed plate and the roller.

In a further aspect of the invention, the means for reducing rolling friction comprises one or more rolling elements constructed from ceramic or alternatively, the one or more rolling elements are constructed from metal and wherein the one or more rolling elements are coated with ceramic thereby completely covering the one or more metal rolling elements. Optionally, the means for reducing rolling friction comprises one or more rolling elements constructed from non-conducting polymeric material.

The at least one pair of drive rollers includes first and second drive rollers, and, wherein the position of the first drive roller is adjustable with respect to the second drive roller for driving differently sized associated wire.

The spool gun drive system optionally has wire support guides having a wire passage for channeling the associated electrically charged wire and wherein the feed plate is constructed from electrically non-conducting material.

The means for reducing rolling friction comprises: a bushing constructed from a dielectric material, often a ceramic material, e.g., glass.

DETAILED DESCRIPTION OF THE INVENTION

Figure 1:
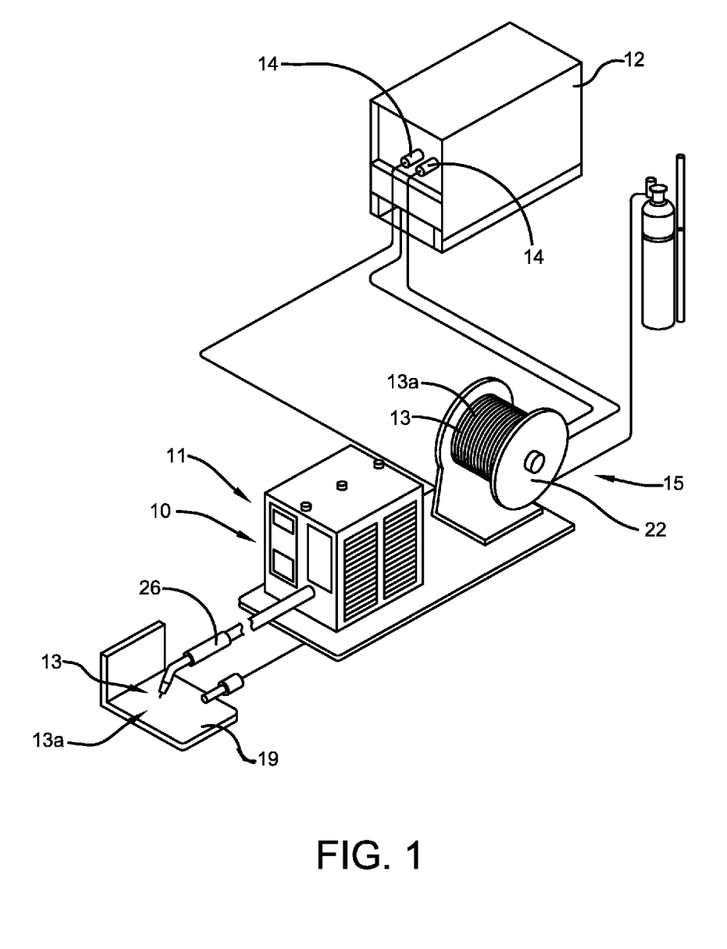
FIG. 1 is a perspective view of a wire feeder used in a welding application.

Referring now to the drawings wherein the showings are for purposes of illustrating embodiments of the invention only and not for purposes of limiting the same, FIG. 1 shows a wire feeder depicted generally at 10. The wire feeder 10 comprises a device for conveying wire 13 from a feed source 15, i.e. wire supply 15, for use in a particular application. For illustrative purposes, the wire feeder 10 will be described in the context of arc welding. However, other applications will become apparent to those skilled in the art, all of which should be construed as falling within the scope of coverage of the embodiments of the subject invention. In one embodiment, wire 13 may comprise a welding electrode 13a, also referred to herein as welding wire 13a, and wire feeder 10 may comprise welding wire feeder 11. Wire 13, 13a may be drawn continuously from a reel 22, box or drum, and delivered to a work piece 19, which in the current embodiment is a weldment. Accordingly, the wire feeder 10, or welding wire feeder 11, may include a drive assembly that utilizes power from one or more locomotive devices that drive the wire 13, 13a to the application work site or work piece 19.

With continued reference to FIG. 1, the welding wire feeder 11 may be used in conjunction with a welding power source 12 as manufactured by, for example, the Lincoln Electric company in Cleveland, Ohio. The welding power source 12 may receive electrical input power, from an outside source, that is directed to an onboard transformer, not depicted in the figures. Output from the transformer may subsequently be connected to welding output terminals 14, or studs 14 of the welding power source 12. Additionally, the welding power source 12 may include a regulated power supply for delivering electrical power to one or more welding accessories, which may include the welding wire feeder 11. A welding gun, designated generally at 26, and wire conduit may be electrically connected to the welding power source 12 through the welding wire feeder 11 for delivering welding current in a manner known in the art. It follows that welding wire 13a is fed through a weld gun 26 and metered out, i.e. dispensed, at the discretion of the application and/or end user in any manner suitable for conducting the welding process. It is noted that the electrode, i.e. welding wire 13, conducts electricity for establishing a welding arc, wherein the electrode is conveyed to the work piece 19 having a voltage potential equal to or approximately equal to the output voltage of the welding power source 12, which may be substantially greater than ground.

Different modes of conveying welding wire 13a are known in the art, an example of which includes pushing the welding wire 13a to the weld gun 26 via power or torque provided by the locomotive device. Other modes of conveying welding wire 13a include push/pull modes that utilize multiple locomotive devices. In any instance, welding wire 13a is delivered to a weld gun 26, which may have a trigger or other activation mechanism for dispensing the wire 13 at the users discretion. At times, it may be necessary to deliver welding wire 13a at varying rates of feed. Therefore, the locomotive device, which may comprise or include a drive motor 18, has an output that is adjustable for varying the rate which welding wire 13a is discharged from the wire feeder 10. In particular, the drive motor 18 itself may be a variable speed drive motor 18.

It is noted here that the wire feeder 11 and/or drive motor(s) 18 may draw operating power from the regulated power supply onboard the welding power source 12. Alternatively, the welding wire feeder 11 may draw power from the open circuit voltage of the welding power source 12, or an altogether separate power source. Still any manner of providing power to operate the welding wire feeder 11 and/or the drive motors 18 may be chosen with sound engineering judgment as is appropriate for use with the embodiments of the present invention.

Figure 2:
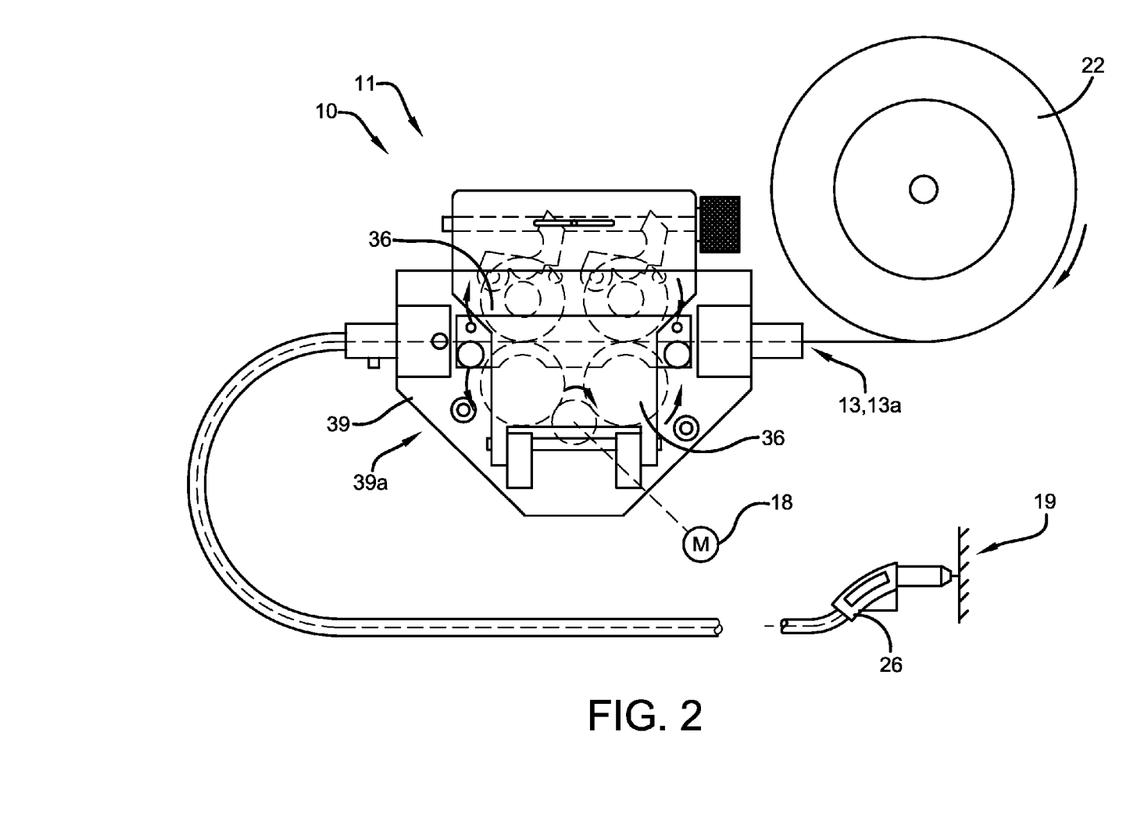
FIG. 2 is a side view of an wire feeder and wire feed source.
Figure 3:
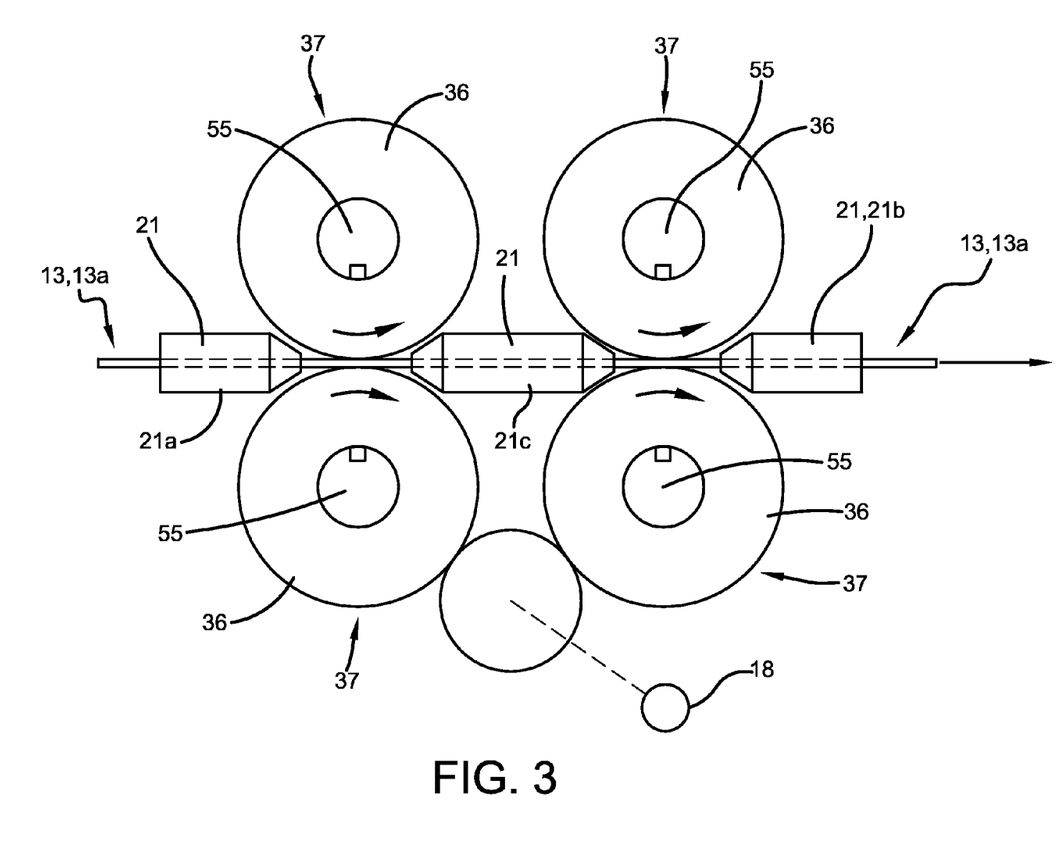
FIG. 3 is a close up side view of drive rollers feeding wire.

With continued reference to FIG. 1 and now also to FIGS. 2 and 3, the welding wire feeder 11 may include a drive assembly, or drive roll assembly. As mentioned above, the drive motor 18, also called a wire feeder motor 18, delivers power, i.e. torque, to convey the welding wire 13a to the weld gun 26 and subsequently to the work piece 19. Drive rollers 36 are included that grip the welding wire 13a for pushing or pulling the welding wire 13a in the appropriate direction, i.e. toward the work piece. The drive rollers 36 are rotatably connected with respect to a frame member or other portion of the wire feeder 11. In one particular embodiment, the drive rollers 36 are rotatably connected to a feed plate 39 or possibly the wire feeder housing. A friction reducing device may be disposed between the drive rollers 36 and the feed plate 39 facilitating smooth and consistent operation of the welding wire feeder 11. In an exemplary manner, bearings 50, shown in FIG. 4, may be incorporated between the drive rollers 36 and the feed plate 39, although other friction reducing devices including, but not limited to, bushings may also be utilized. Still, any type of device that reduces rolling friction may be used to facilitate sustained operation of the driver rollers 36 as is appropriate for use with the embodiments of the present invention.

With reference to FIG. 3, the drive roll assembly may include a plurality of electrically conductive wire support guides 21 spaced along a wire trajectory. The wire support guides 21 may each incorporate a wire passage, or throughhole, for guiding the wire 13, 13a. The wire support guides 21 may be oriented such that the wire passages are axially aligned and thereby define the wire trajectory in the region between the driver rollers 36, which may comprise adjacently positioned pairs of drive rollers 36. The plurality of wire support guides 21 may include first and second end guides 21a, 21b. Additionally, a center guide 21c may be disposed between pairs of drive rollers 36. Still, it will be appreciated that any configuration and quantity of wire support guides 21 and drive rollers 36 may be included as chosen with sound judgment.

Each drive roller 36, in accordance with one embodiment of the subject invention, may include an outer circumference 37 for contacting the welding wire 13a and a hub 54 for rotation about a central axis. In an exemplary manner, the drive rollers 36 may be cylindrical in configuration, or more specifically disk-shaped, although the particular configuration should not be construed as limiting. The surface, i.e. the outer circumference 37, of the driver roller 36 may be comprised of a sufficiently hardened material, like steel, that is durable and suitable for gripping the wire 13, 13a. In one embodiment, drive rollers 36 may be disposed in pairs along the wire trajectory with each drive roller pair being supported on opposing sides thereof such that respective outer circumferences 37 contact opposite sides of the wire 13, 13a. It is noted that the central axes of respective drive rollers 36 extend substantially parallel with one another and generally transverse to the trajectory of the wire 13, 13a. In one particular embodiment, the relative position of the drive rollers 36 in one set, or pair, may be adjustable for use with wires of different diameters. Stated differently, the outer circumference of one drive roller 36 may be adjustable with respect to the outer circumference of an adjacent driver roller 36 for changing the distance therebetween thus accommodating different sizes of wire 13, 13a. In this manner, the driver roller pairs may be selectively positioned for gripping the welding wire 13, 13a with the appropriate amount of gripping force.

The hubs 54 of the drive rollers 36 may be rotatably supported by the feed plate 39 or other portion of the housing 39a, as previously mentioned. In one embodiment, the hubs 54 are supported by bearing(s) 50 incorporating a plurality of rolling elements, or alternatively by bushings. However, any means for facilitating sustained rotational operation of the driver rollers 36 may be chosen as is appropriate for use with the embodiments of the subject invention. Shafts 55 may be included that extend from the hub 54 and into engagement with a bearing race. In one exemplary manner, the drive rollers 36 may be mounted on corresponding shafts 55 for rotation therewith by a key and keyway arrangement, although any suitable arrangement for engaging the drive rollers 36 may be incorporated. Additionally, shafts 55 for each set or pair of drive rollers 36 may be driveably engaged with the drive motor 18 and with one another such that the shafts 55 rotate together for conveying the wire 13, 13a in a desired direction. The shafts 55 may be driveably engaged via gears or pulleys and belts, not shown, retained on the shafts 55 by any suitable mechanism, like for example a set screw or other fastener. It will be understood that the gears or pulleys may have sufficient clearance between the extents thereof to accommodate relative radial movement of the outer circumferences 37 of the drive rollers 36 in a manner consistent with that described above. It is noted here that the shafts 55 and corresponding driver rollers 36 rotate in opposing directions for advancing the wire 13, 13a in a designated direction. In other words, the driver roller 36 on one side of the wire 13, 13a may rotate clockwise while the drive roller 36 on the opposing side of the wire 13, 13a rotates counterclockwise, as illustrated by the arrows in FIG. 3.

Figure 4:
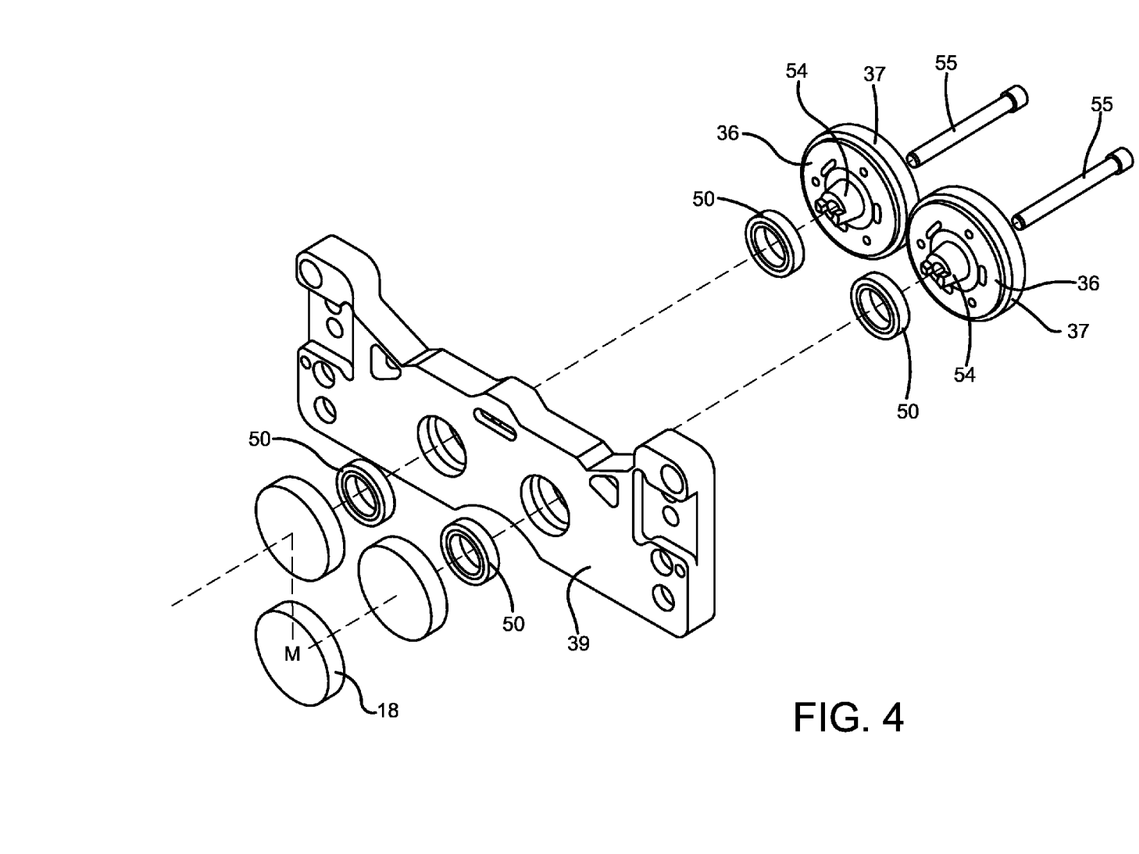
FIG. 4 is an expanded perspective view of a feed plate and accompanying drive rollers.

Still referencing FIG. 2 and now also FIG. 4, the feed plate 39 may comprise a generally rigid piece of material suitably strong for supporting the drive roll assembly. In one embodiment, the feed plate 39 may be separate from the housing of the wire feeder 11 and affixed to the housing via fasteners or other means. Accordingly, feed plate 39 is mounted onto or within the wire feeder housing. The feed plate 39 may be comprised of aluminum. However, the feed plate 39 may be comprised of other materials including steel in any of various alloys or other non-metallic materials having sufficient strength and rigidity for supporting the drive assembly. It should be noted that during operation of the wire feeder 11, the feed plate 39 may be subject elevated temperature. Accordingly, the feed plate 39 will have the requisite rigidity and the ability to withstand high temperatures without failure. In one particular embodiment, the feed plate 39 may be constructed from an electrically non-conducting material for preventing arcing or sparking resulting from differences in voltage potential between components of the drive roll assembly, examples of which may include ceramic based materials. Alternatively, feed plate 39 may be constructed from polymeric material. Still, any suitable material may be used to construct the feed plate 39 as chosen with sound engineering judgment. The feed plate 39 may have a thickness in the range of ¼ inch to 1½ inches thick. However, any thickness of material, or length and width of material, may be chosen with sound engineering judgment. It is noteworthy to mention that alternate embodiments of the subject invention are contemplated wherein the drive roll assembly is connected directly to the housing of the wire feeder 11, and not to the feed plate 39. In this instance, the housing 39a itself may be sufficiently rigid and strong to support the drive roll assembly functioning effectively as the feed plate 39. Still it is to be construed that any manner of supporting the drive roll assembly may be chosen without departing from the intended scope of coverage of the embodiments of the subject invention.

FIG. 4 shows an exemplary embodiment of one configuration of feed plate 39 and drive rollers 36. In this configuration, bearings 50 may be installed into the feed plate 39, which may have recesses that receive the outer bearing race. In particular, four (4) bearings are shown, although the number of bearings 50 may vary without departing from the intended scope of coverage of the embodiments of the subject invention. Shafts 55, or alternatively pins, may connect the drive rollers 36 with the bearings 50. It follows that the shafts 55 may be received into the bearings 50 and may be press fit into a fixed relationship with respect to the bearing inner race. In this manner, the driver roller 36, shaft 55 and inner bearing race rotate together.

Figure 5:
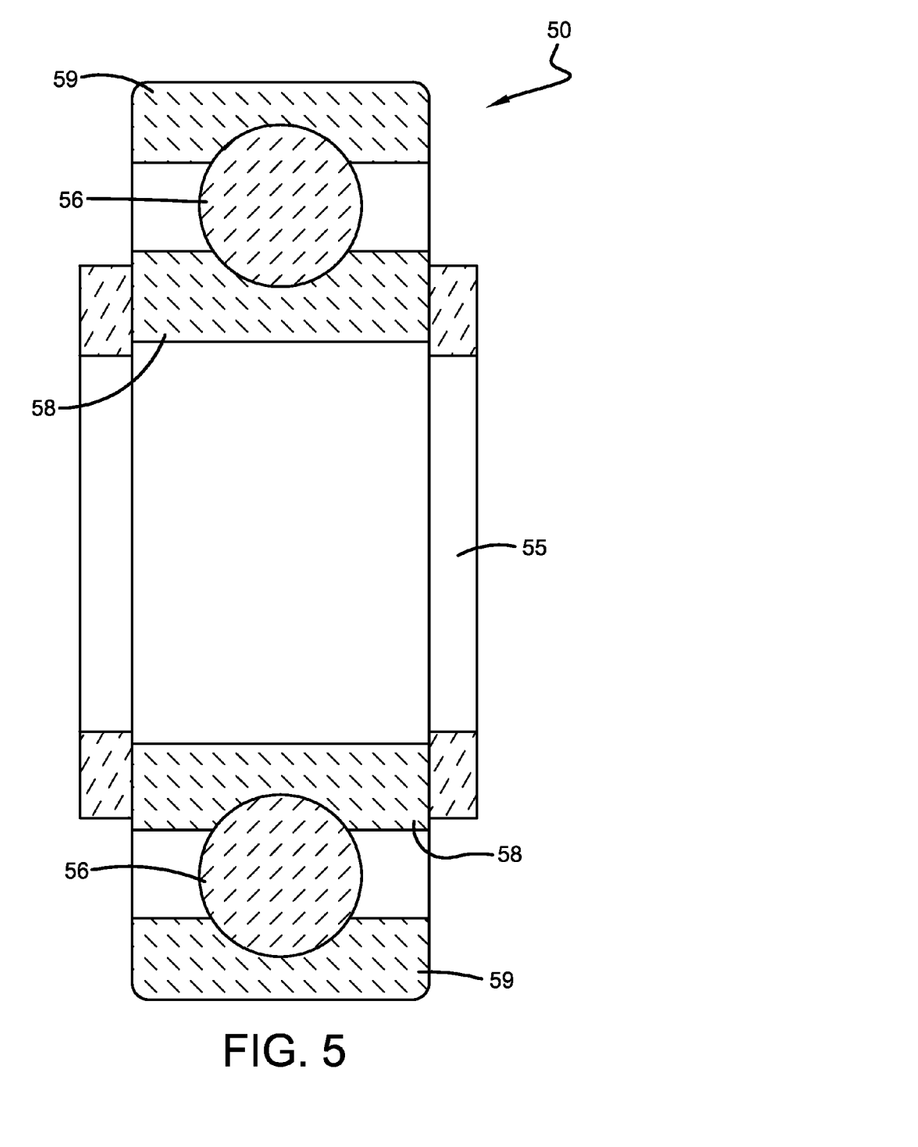
FIG. 5 is cutaway side view of a non-conductive friction reducing device.

With continued reference to FIG. 4 and now to FIG. 5, in one exemplary embodiment, one or more components of the drive roll assembly may be constructed from non-conducting materials, i.e. electrically non-conducting or electrically insulating materials. For example, part or all of the drive roll assembly may be comprised of dielectric materials or any material(s) that substantially inhibits or prevents arcing, i.e. electrical discharging across a gap, due to differences in voltage potential. Example of these materials may include ceramic or ceramic-based material. Other types of materials may include glass. Moreover, certain types of polymeric materials may be utilized.

In one embodiment, part or all of the bearings 50 may be constructed from non-conducting materials. The bearings 50 may include a plurality of rolling elements, which may be bearing balls 56, disposed between generally circular inner 58 and outer 59 races. In one particular embodiment, the bearings balls 56, which may be spherical, are constructed from non-conducting material, while the remaining components may be constructed from more traditional materials, such as metal, e.g. steel or other alloy. Illustratively, bearing balls 56 may be made from ceramic and the inner and outer races 58, 59 may be constructed from steel. Alternatively, one or both of the races 58, 59 may be constructed from ceramic while the rolling elements are constructed from steel. In yet another embodiment, all of the bearing components may be constructed from ceramic. Still, it will be appreciated that any combination of the components making up bearing 50 may be constructed from non-conducting material without departing from the intended scope of coverage of the embodiments of the subject invention. In this way, arcing or sparks resulting from differences in the voltage potential between the electrode 13a contacting the drive rollers 36 and the feed plate 39, 39a will be substantially inhibited and/or prevented by the dielectric materials.

In another embodiment of the subject invention, one or more of the bearing components may be covered or coated with a dielectric material. In an illustrative manner, the bearing balls 56 may be covered with an outer most layer of ceramic. It will be appreciated that the entire surface of the bearing balls 56 may be covered with ceramic as the bearing balls rotate eventually making contact with the inner 58 and outer 59 bearing races over its entire surface, thus preventing or reducing sparks therebetween. Other bearing components may be completely or only partially covered with a dielectric material. For example, the inner 58 and outer 59 bearing races may be covered with ceramic, or other dielectric, on the surfaces contacting the bearing balls 56 or over its entire surface. Still, any combination of the aforementioned may be incorporated.

Figure 6:
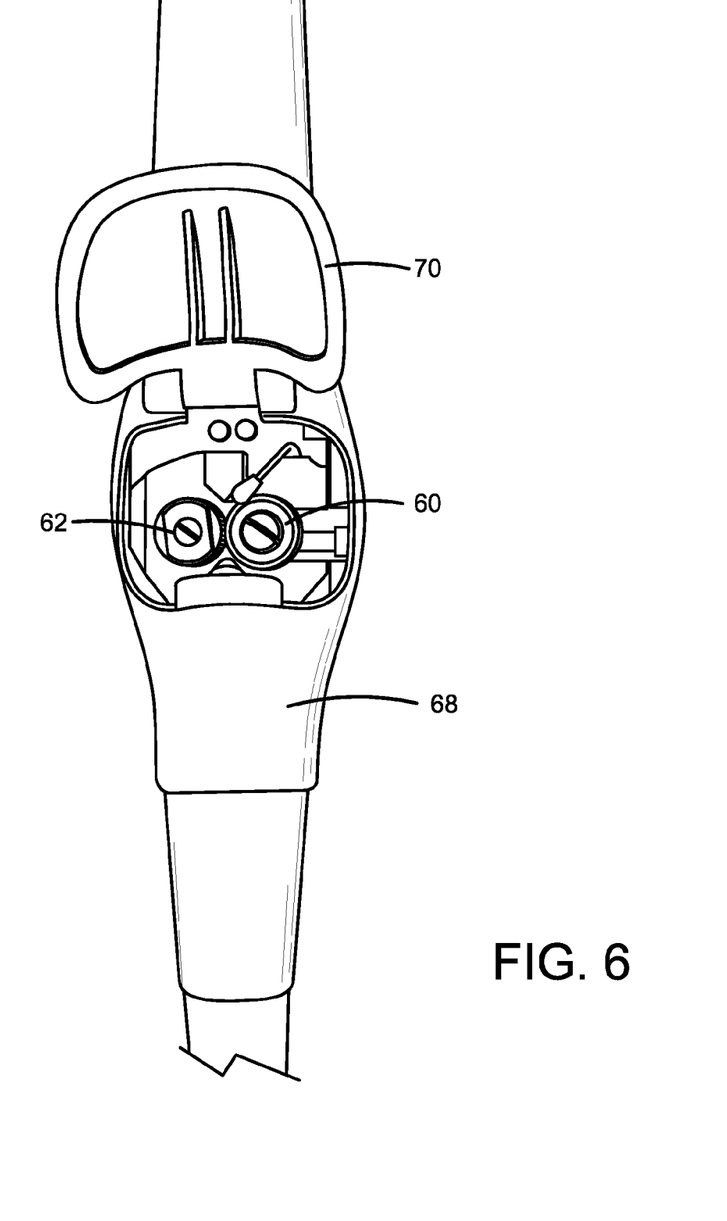
FIG. 6 is a top elevational view of a wire feeder contained within the housing of a welding gun.
Figure 7:
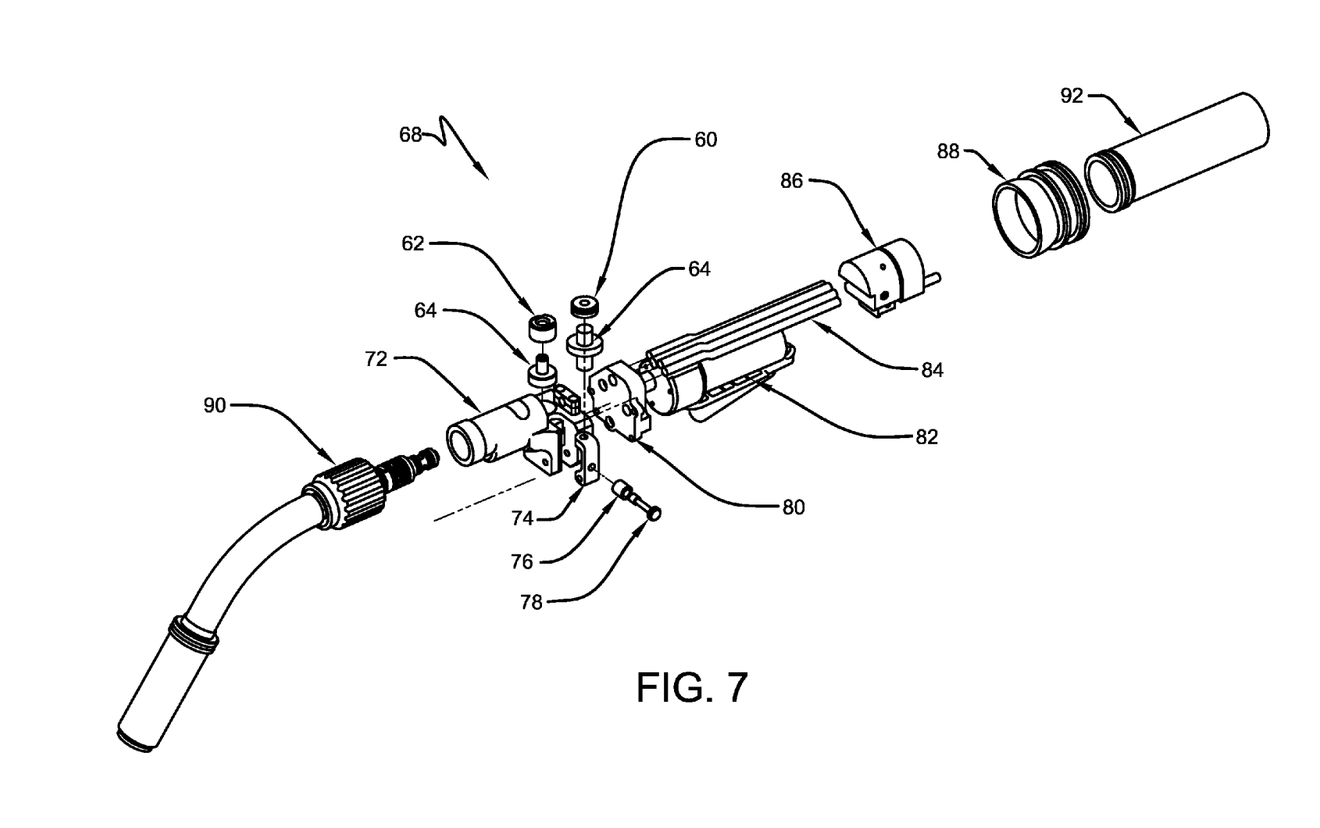
FIG. 7 is an assembly view of the wire feeder of FIG. 6.

As illustrated in FIGS. 6-7, and as mentioned previously, the invention is applicable to push-pull systems in which dual motors are used: an assist motor that pushes the electrode from the feeder, and a primary motor that is located in the gun that pulls the electrode. This is particularly useful when employing softer welding wires, e.g., aluminum. The invention is equally applicable to spool guns. FIGS. 6-7 show an exemplary embodiment of one configuration of feed rollers 60,62 (at least one of which is a drive roller) positioned within welding gun 68, the welding gun having removable cover 70 to expose at least one of the feed rollers. Bearings 64 are installed under the feed rollers 60,62 which may have recesses that receive the outer bearing race. In particular, a bearing is employed with each feed roller in a manner similar to that illustrated in FIG. 4 or as alternatively illustrated in FIG. 7. It is recognized that the number of bearings 64 may vary without departing from the intended scope of coverage of the embodiments of the subject invention. Shafts, or alternatively pins, may connect feed rollers 60,62 with bearings 64 or as illustrated in FIG. 7, the shaft and ceramic bearing are one piece, at least the shaft of which is constructed of a non-conductive material, and in one embodiment, both the shaft and bearing are constructed of a non-conductive material. It follows that the shafts may be received into bearings 64 and may be press fit into a fixed relationship with respect to the bearing inner race. In this manner, a feed roll 60 or 62, and its respective shaft and inner bearing race rotate together.

One or more components of the drive roll assemblies are constructed from non-conducting materials, i.e. electrically non-conducting or electrically insulating materials. For example, part or all of the drive roll assembly may be comprised of dielectric materials or any material(s) that substantially inhibits or prevents arcing, i.e. electrical discharging across a gap, due to differences in voltage potential. Example of these materials may include ceramic or ceramic-based material. Other types of materials may include glass. Moreover, certain types of polymeric materials may be utilized.

In one embodiment, part or all of the bearings 64 may be constructed from non-conducting materials. The bearings 64 may include a plurality of rolling elements, which may be bearing balls 66, disposed between generally circular inner and outer races in a manner to that described previously with regard to FIG. 4. In one particular embodiment, the bearings balls 66, which may be spherical, are constructed from non-conducting material, while the remaining components may be constructed from more traditional materials, such as metal, e.g. steel or other alloy. Illustratively, bearing balls 66 may be made from ceramic and the inner and outer races may be constructed from steel. Alternatively, one or both of the races may be constructed from ceramic while the rolling elements are constructed from steel. In yet another embodiment, all of the bearing components may be constructed from ceramic. Still, it will be appreciated that any combination of the components making up bearing 64 may be constructed from non-conducting material without departing from the intended scope of coverage of the embodiments of the subject invention. In this way, arcing or sparks resulting from differences in the voltage potential between the electrode 13a contacting the drive rollers 36 and the feed plate 39, 39a in addition to the feed rollers 60,62 will be substantially inhibited and/or prevented by the dielectric materials.

In another embodiment of the subject invention, one or more of the bearing components may be covered or coated with a dielectric material. In an illustrative manner, the bearing balls may be covered with an outer most layer of ceramic. It will be appreciated that the entire surface of the bearing balls may be covered with ceramic as the bearing balls rotate eventually making contact with the inner and outer bearing races over its entire surface, thus preventing or reducing sparks therebetween. Other bearing components may be completely or only partially covered with a dielectric material. For example, the inner and outer bearing races may be covered with ceramic, or other dielectric, on the surfaces contacting the bearing balls or over its entire surface. Still, any combination of the aforementioned may be incorporated.

As better illustrated in FIG. 7, an assembly view of a feed mechanism of the invention, a combination of at least one drive roll 62 is in operative relationship to idler drive roll 60, each of which are positioned via a shaft with associated ceramic bearing 64 into apertured feed plate 72, one end of which is in communication with gooseneck 90 of welding gun 68. The tension of idler drive roll with driven drive roll 62 is maintained by spring 76 and adjustment screw 78 against idle arm 74, into which is positioned the ceramic bearing and shaft 64 of idler drive roll 60. Positioned adjacent the drive rolls is motor gearbox mounting plate 80 in communication with motor gearbox 82. A plurality of tubes for gas, water, conduit 84 interface through motor gearbox and feed plate into gooseneck 90 via cable connection 86 adjacent to strain relief 88 and cable 92.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A wire feeder for conveying associated welding wire, comprising:
    a wire feeder having one or more drive rollers, the one or more drive rollers being adapted to push the associated welding wire toward the welding gun;
    a welding gun operatively connected to the wire feeder for conveying associated welding wire used in arc welding, the welding gun having at least one drive roller within the welding gun to pull the welding wire toward an egress aperture in the welding gun, the at least one drive roller within the welding gun having a generally U-shaped idle arm in operative connection with an idler drive roll, a tension between the idle arm and idler drive roll controlled by a tensioned adjustment screw on the idler arm;
    the wire feeder having one or more drive rollers and the welding gun having at least one drive roller within the welding gun being separated by a length of cable within which the welding wire is disposed therein;
    at least a first driver motor operatively connected to deliver power for rotating the one or more drive rollers in the wire feeder;
    at least a second driver motor operatively connected to deliver power for rotating the at least one drive roller in the welding gun; and,
    one or more bearings positioned between the one or more drive rollers in the wire feeder and the at least one drive roller within the welding gun, said one or more bearings coaxial with each of said one or more drive rollers, wherein each of the one or more bearings is electrically non-conducting for preventing the discharge of electrical energy across the one or more bearings.

2. The wire feeder as defined in claim 1, wherein the one or more bearings are constructed from a dielectric material.

3. The wire feeder as defined in claim 1, wherein the one or more bearings are constructed from ceramic.

4. The wire feeder as defined in claim 1, wherein at least the drive rollers are constructed from electrically non-conducting material.

5. The wire feeder as defined in claim 4, wherein said drive rollers further comprise:
    a plurality of adjacent spherical bearing balls, and, wherein the bearing balls are constructed from ceramic.

6. The wire feeder as defined in claim 1, wherein the drive motors are variable speed drive motors for conveying the associated welding wire at varying speeds.

7. A push-pull drive system for a welding wire feeder conveying associated electrically charged wire, comprising:
    a first wire feeding means positioned external to a welding wire gun, said first wire feeding means comprising:
    a generally rigid apertured first feed plate having one or more recesses; at least one first drive roller rotatably connected with respect to the first feed plate, wherein the at least one first drive roller is spaced apart to propel the associated electrically charged wire, said at least one first drive roller having an opposed roller which matingly engages with the at least one first drive roller;
    a first means for reducing rolling friction operatively positioned between said at least one first drive roller and the first feed plate, said first means for reducing rolling friction being coaxially positioned with said at least one first drive roller, and wherein said first means for reducing rolling friction is electrically non-conducting for substantially preventing the discharge of electrical energy between the first feed plate and the at least one first drive roller; and
    a second wire feeding means positioned within the welding wire gun, said second wire feeding means comprising:
    a second apertured welding wire feed plate positioned within the welding gun, one side of the second feed plate connected to a gun gooseneck;
    at least one second drive roller rotatably connected with respect to the second feed plate, wherein the at least one second drive roller is spaced apart to propel the associated electrically charged wire, said at least one second drive roller having an opposed roller which matingly engages with the at least one second drive roller, the at least one second drive roller within the welding gun having a generally U-shaped idle arm in operative connection with an idler drive roll, a tension between the idle arm and idler drive roll controlled by a tensioned adjustment screw on the idler arm; and a second means for reducing rolling friction operatively positioned between said at least one second drive roller and the second feed plate, said second means for reducing rolling friction being coaxially positioned with said at least one second drive roller, and wherein said second means for reducing rolling friction is electrically non-conducting for substantially preventing the discharge of electrical energy between the second feed plate and the at least one second drive roller.

8. The system as defined in claim 7, wherein each of said means for reducing rolling friction comprises
one or more rolling elements constructed from ceramic.

9. The system as defined in claim 7, wherein
each of the one or more rolling elements are constructed from metal and wherein the one or more rolling elements are coated with ceramic thereby completely covering the one or more metal rolling elements.

10. The system as defined in claim 7, wherein each of said means for reducing rolling friction comprises
one or more rolling elements constructed from non-conducting polymeric material.

11. The system as defined in claim 7, wherein
the at least one first drive roller in the wire feeding means includes an additional drive roller, and, wherein
the position of the first drive roller is adjustable with respect to the additional drive roller for driving differently sized associated wire.

12. The system as defined in claim 7, further comprising:
a wire support guides having a wire passage for channeling the associated electrically charged wire.

13. The system as defined in claim 7, wherein
the first and second feed plates are constructed from electrically non-conducting material.

14. The system as defined in claim 7, wherein each of said means for reducing rolling friction comprises:
a bushing constructed from a dielectric material.

15. The system as defined in claim 14, wherein
the bushing is constructed from ceramic.

16. The system as defined in claim 14, wherein
the bushing is constructed from glass.

17. The system as defined in claim 7, wherein each of said means for reducing rolling friction comprises:
at least one bearing race and a plurality of rolling elements, wherein the at least one bearing race is received into the one or more recesses of each of said feed plates; and wherein
the at least one bearing race or the plurality of rolling elements is coated or constructed from a non-conductive dielectric material.

18. A spool gun drive system for a welding wire feeder conveying associated electrically charged wire, comprising:
a welding wire gun housing, the housing having a removable cover pivotable between an open position and a closed position;
a wire feeding means positioned within the welding wire gun housing, said wire feeding means comprising:
an apertured welding wire feed plate positioned within the welding gun housing, one side of the feed plate connected to a gun gooseneck;
at least one pair of a drive roller in operative connection with an idler roller, each of said drive roller and said idler roller rotatably connected with respect to the feed plate, wherein the pair of the drive roller and idler roller are spaced apart to propel the associated electrically charged wire, the at least one pair of the drive roller and idler roller exposed when the cover is in the open position; and a means for reducing rolling friction operatively positioned between each of said rollers and the feed plate, said means for reducing rolling friction being coaxially positioned with said rollers, and wherein said means for reducing rolling friction is electrically non-conducting for substantially preventing the discharge of electrical energy between the feed plate and the roller; and a generally U-shaped idle arm in operative connection with the idler drive roller, a tension between the idle arm and idler roller controlled by a tensioned adjustment screw on the idler arm.

19. The spool gun drive system as defined in claim 18, wherein said means for reducing rolling friction comprises
one or more rolling elements constructed from ceramic.

20. The spool gun drive system as defined in claim 19, wherein
the one or more rolling elements are constructed from metal and wherein the one or more rolling elements are coated with ceramic thereby completely covering the one or more metal rolling elements.

21. The spool gun drive system as defined in claim 19, wherein each of said means for reducing rolling friction comprises
one or more rolling elements constructed from non-conducting polymeric material.

22. The spool gun drive system as defined in claim 18, wherein
the at least one pair of drive roller and idler roller further includes a second pair of drive roller and idler roller, and, wherein
the position of the first drive roller is adjustable with respect to the second drive roller for driving differently sized associated wire.

23. The spool gun drive system as defined in claim 18, further comprising:
a wire support guides having a wire passage for channeling the associated electrically charged wire.

24. The spool gun drive system as defined in claim 18, wherein
the feed plate is constructed from electrically non-conducting material.

25. The spool gun drive system as defined in claim 18, wherein said means for reducing rolling friction comprises:
a bushing constructed from a dielectric material.

26. The spool gun drive system as defined in claim 25, wherein
the bushing is constructed from ceramic.

27. The spool gun drive system as defined in claim 26, wherein
the bushing is constructed from glass.

* * * * *